United States Patent

[11] 3,570,750

| [72] | Inventor | James R. Wood<br>Crescent Willowdale, Ontario, Canada |
| [21] | Appl. No. | 792,555 |
| [22] | Filed | Jan. 21, 1969 |
| [45] | Patented | Mar. 16, 1971 |
| [73] | Assignee | E. S. & A. Robinson (Canada) LTD.<br>Toronto, Ontario, Canada |
| [32] | Priority | Oct. 11, 1968 |
| [33] | | Canada |
| [31] | | 032,319 |

[54] PLASTIC BAGS
3 Claims, 9 Drawing Figs.

[52] U.S. Cl................................................. 229/58,
229/53
[51] Int. Cl.................................................. B65d 31/00
[50] Field of Search........................................ 229/58, 53;
93/35, 20

[56] References Cited
UNITED STATES PATENTS

| 2,821,337 | 1/1958 | Morgan, Jr. ................. | 229/57 |
| 3,185,044 | 5/1965 | Ahlbrandt .................... | 93/20 |

*Primary Examiner*—David M. Bockenek
*Attorney*—Stevens, Davis, Miller and Mosher

ABSTRACT: A method for producing "square bottom" plastic bags having printing on one face and the entire bottom wherein one film forms the pointed face and bottom and a second film forms the opposed face, wherein the two films are fed into face to face relationship and longitudinally sealed and subsequently transversely sealed and cut with a gusset on one side of the longitudinal seal. Preferably two identical bags are produced simultaneously by locating the longitudinal seal in the center of the film and forming a gusset on each side of the longitudinal seal.

PATENTED MAR 16 1971　　3,570,750

INVENTOR
JAMES R. WOOD
By Stevens, Davis, Miller & Mosher
ATTORNEYS

PLASTIC BAGS

This invention relates to containers or bags made from thermoplastic films. More particularly it relates to a method of making a plastic bag having a fully printed face and bottom gusset, and to a novel "square bottom" bag.

Numerous types of thermoplastic bags are produced for a multitude of commercial purposes and it is becoming increasingly important that such bags shall properly identify the product they contain and also to advertise their contents as advantageously as possible. To this latter end, processes have been developed to print successfully on the common thermoplastic materials used for bag manufacture, such as polyethylene. In one such process a web of polyethylene is printed on one face and, using a modified Schjeldahl bag making machine, heat sealed to a second plain polyethylene web, and subsequently the two webs are severed into individual bags printed on one face. This procedure is satisfactory for a simple bag which is not required to have a gussetted bottom.

When gussetted bottom bags, which, when filled simulate square bottomed bags, are required, having printing on one face and the entire bottom and with the back face unprinted, the usual practice is to take a single web of polyethylene, print on the necessary area, fold the web double, form the bottom gusset and then heat seal the two sides of the bag. On deep bags, for example a bread bag which is 18 inches or more deep, with a bottom gusset of say 4 inches, a single web 40 inches wide or more must be employed. The 40 inch wide web must be run through a 40 inch wide printing press in order to print the 22 inches necessary to produce a printed side and bottom for the bag. This is a costly procedure as the production of the high hourly rated complex printing press necessary to produce good quality in-register printing is reduced to almost half of the rated capacity output as only about half the web is printed.

In order to improve the productivity of the printing presses, two webs have been employed in bag manufacture. One web is printed and the other is plain. The printed web is printed two impressions wide and superimposed on a plain web, two impressions wide. A longitudinal heat seal and slitting operation is carried out between the two impressions, the bottom gusset is then formed and bags are then completed by a transverse sealing and cutting operation. The result of this method is a symmetrical bag having the front face and only half the bottom gusset printed.

It is, therefore, an object of the present invention to provide a method of making a thermoplastic bag having one face and the full bottom gusset area formed from a single web, and the opposed face formed from a second web, whereby said first web may be printed over its entirety by a high speed press.

Another object of the present invention is to provide a plastic bag wherein one face and the bottom gusset are formed from a single web and the opposed face is formed from a second web, and wherein said one face and bottom may be printed.

By one aspect of the invention it has been found that the objects may be achieved by forming a gusset in a first thermoplastic film, feeding the film into face to face contact with a second film, longitudinally sealing the films together to include said bottom gusset adjacent the longitudinal seal and subsequently transversely sealing and cutting said films to form individual bags.

In a preferred embodiment of the invention the films are both two impressions wide, a single or double gusset is formed remote from either side edge of the first film and the films are fed into face to face relationship, a longitudinal sealing and slitting operation is performed adjacent to the gusset thereby forming a pair of bag bottoms and subsequently transversely sealing and severing the films to form individual bags.

In a still more preferred embodiment the bottom gusset is a double gusset formed centrally between the marginal side edges of the first web and the longitudinal sealing and slitting operation is performed in the center of the double gusset thereby forming two identical bags. In an optional, but preferred, form, the first web is allover printed on a conventional high speed wide press.

In an alternative embodiment the films, which may or may not be printed, are longitudinally heat sealed and slit and subsequently the top film is provided with a gusset adjacent the longitudinal heat seal. It will be appreciated that at the gusset forming stage the films have been slit into two thus a gussetting operation may be required on each of two top films.

The invention will be described in more detail hereinafter with reference to the drawings in which.

Figure 1:
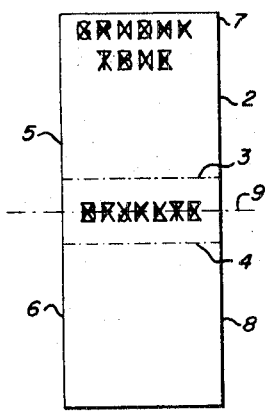
FIG. 1 represents a single web printed according to the prior art.

As previously indicated, the prior art teaches making a bag with one face and the bottom printed, from a single web as shown in FIG. 1. The line 9 indicates the centerline about which the web 2 is doubled. 3 and 4 indicate the crease lines forming the bottom gusset. Following the doubling and the formation of the bottom gusset, side edge 5 is heat sealed to side edge 6 and side edge 7 is sealed to side edge 8, thus forming a square bottomed bag having heat sealed side edges. Such bags may be made continuously on a Schjeldahl machine. This method is simple but, when printed bags are required the printing costs are excessive as although only little more than half the web is printed, a printing press wide enough to handle the entire web must be employed. The productivity of the printing press is therefore reduced.

Figure 2:
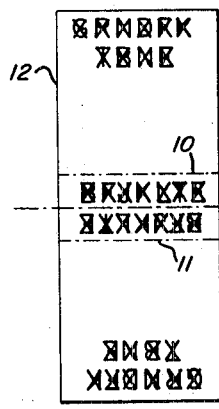
FIG. 2 represents a web printed according to an alternative form of the prior art.
Figure 4:
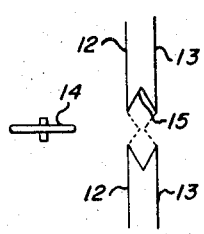
FIG. 4 represents a vertical section through a bag machine showing the longitudinal slit and seal means according to the prior art.
Figure 8:
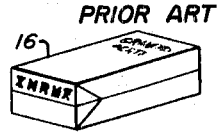
FIG. 8 is a sketch of a bag according to the prior art.

One way to overcome this defect is to print a web as shown in FIG. 2. 9 represents the centerline and 10 and 11 the bottom gusset crease lines in the web 12. Web 12 is fed into a bag machine and into contact with an unprinted web 13, as shown in FIG. 4. A heat seal and slitting means 14 heat seals and slits the two webs 12 and 13 along the line 9, thereby forming the bottom seal for a pair of bags, a gusset 15 is then formed and subsequently the webs are side sealed and cut to form bags as shown at 16 in FIG. 8. Clearly only half of the bottom gusset is printed, and for certain applications this is not sufficient.

Figure 3:
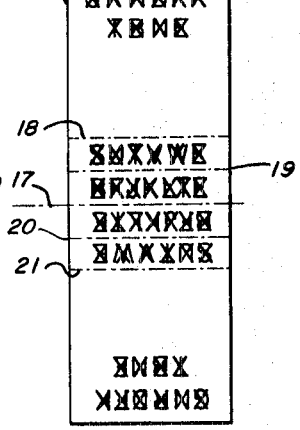
FIG. 3 represents a web printed according to the present invention.
Figure 5:
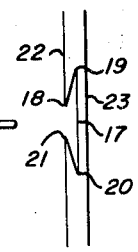
FIG. 5 represents a vertical section through a bag machine showing the longitudinal slit and seal means according to the present invention.
Figure 9:
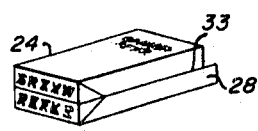
FIG. 9 is a sketch of a bag according to the present invention.

According to the present invention, therefore, a web, of any suitable thermoplastic material and preferably of polyethylene, is printed as shown in FIG. 3. 17 is the centerline and 18, 19, 20 and 21 are the crease lines forming the bottom gusset for each of two identical bags. The web 22 is fed to a bag machine and into contact with an unprinted web 23 as in FIG. 5. The double bottom gussets are formed along 18, 19, 20 and 21 and subsequently heat sealed and slit along the line 17, with a sealer 14, thereby forming the bottom of a pair of identical bags having fully printed bottoms. Transverse heat seals and cuts are subsequently made to form bags 24 as shown in FIG. 9.

Figure 7:
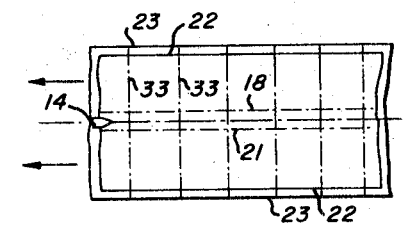
FIG. 7 is a plan view diagram of a web slit and sealed according to the present invention.
Figure 6:
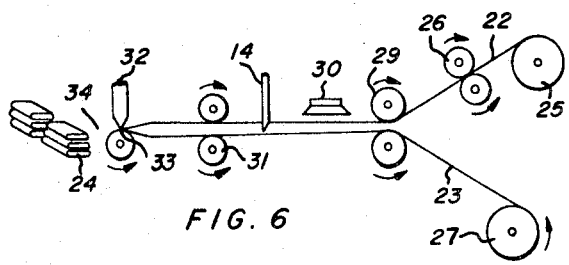
FIG. 6 is a diagram of a bag making process according to the present invention.

The process for forming bag 24 is shown more clearly by reference to FIGS. 6 and 7 which describe a particular bag and is not to be construed in a limiting manner as clearly many sizes of bags may be formed. To produce a bag 18½ inches deep with a 3½ inch square bottom and a 1½ inch top lip, the web 22, which is about 44 inches wide is unwound from a feed roll 25, through a high speed in-register printing roll 26. This web forms one face and the bottom of the bags. Unprinted web 23, which is approximately 40 inches wide is unwound from feed roll 27. Web 23 forms the 18½inch back face of the bags and the 1½inch back lip 28 of the bags. Webs 22 and 23 are brought into face to face relationship by an appropriate guide means 29, such as a pair of guide rolls, either before or after a gussetting means 30. The top web 22 is passed through the gussetting means 30 to form the double central gusset shown in FIG. 5, between 18, 19, 20 and 21. The two face to face webs are then heat sealed and slit by the longitudinal sealer and cutter 14 along the centerline 17, thus forming the bottom seals of a pair of bags simultaneously. The two semiformed bags are then transferred by any suitable transfer and locating means, shown in FIG. 6 as roll means 31 to a reciprocating transverse sealer and cutter 32 which forms the side welds 33 of the bags 24 and severs each bag from the leading edge of the succeeding bag. Completed bags 24 are collected in two piles at 34.

Bags 24 produced according to the method of the present invention are superior to the bags of the prior art as they have a seam free bottom face which is more pleasing to the eye and in addition are susceptible to allover printing. The bottom of the bag is also completely symmetrical and therefore when the bag is placed on its end it will stand squarely without strain or distortion at the corners. In Canadian Pat. No. 698,175 and No. 699,592 for example, a square bottom bag having a seam only along one side of the bottom is suggested but these bags must of necessity be slightly asymmetric, due to their mode of construction. In these patents simultaneous sealing and cutting of both the sides and bottom by a single heat sealing bar is envisaged and unless the edges forming the bottom seal protrude from the overlying gusset to ensure clearance for the heat sealing bar, a square bottom bag cannot be produced as the heat sealing bar would heat seal the lower edges to the overlying gusset.

Although the present invention has been particularly described with reference to the production of pairs of identical bags printed on one face and the entire bottom, the invention is not to be construed in this limited sense. Clearly many modifications are possible and fall within the scope of the invention. For example, printing is, in fact, an optional feature and may be omitted entirely or the unprinted bottom web 23 may be printed alone or in addition to the top web 22. It is also possible to produce pairs of nonidentical bags, as for example by locating the bottom gusset to one side of the centerline 17 of the web 22. If the gusset is located adjacent one marginal side edge of the web a single bag, rather than a pair of bags may be produced. Alternatively, a single, rather than a double gusset may be formed so that one gussetted bottom bag and one flat bag is produced on each cycle.

In the method described herein, a bag having an additional tuck in the bottom of the sidewall is produced. In certain applications this construction may not be desirable and may be avoided by cutting out a V-notch at bag width intervals after the longitudinal heat seal and gussetting operations are performed. The inner surfaces of the gusset, which form the outer bottom face of the erected bag are coated with an ink, lacquer or other substance to prevent the coated surfaces from sticking together during a subsequent heat seal operation to form the side seals and sloping seals which form the bottom and which appear on the sidewalls of the erected bag. Alternatively, the inner surfaces of the gusset may be treated as by corona discharge or other means to effect a heat seal resisting surface. Subsequently, the straight and angled side seams are heat sealed into the films using a Y-shaped transverse sealer and cutter instead of the previously employed straight bar transverse sealer and cutter 32. In addition to these embodiments, many other modifications will suggest themselves to those skilled in the art as being within the scope of the present invention as defined in the claims.

I claim:

1. A bag having two face panels, two side panels and a symmetrical rectangular bottom when in an erected position, one said face panel, a longitudinally extending half of each of said side panels and said rectangular bottom being formed from a first thermoplastic film, the second said face panel and the other half of each of said side panels being formed from a second thermoplastic film, said bag having a heat seal along a single edge of said rectangular bottom sealing said bottom to said second face panel, and longitudinal heat seals sealing opposed pairs of said half side panels.

2. A bag as claimed in claim 1 wherein said first film is printed on at least a substantial area of its surface and said second film is unprinted.

3. A bag as claimed in claim 1 including gussets between said face panels in the unerected position treated with a heat seal resist means, each of said longitudinal heat seals including an angled portion coinciding with a respective gusset whereby a triangular portion of said gusset forms part of a respective sidewall in the erected position.